United States Patent [19]

Furando

[11] 4,172,613
[45] Oct. 30, 1979

[54] GLARE SHIELD

[76] Inventor: Joseph V. Furando, 37 Balance Rock Rd., Seymour, Conn. 06483

[21] Appl. No.: 906,949

[22] Filed: May 16, 1978

[51] Int. Cl.² ............................................. B60J 3/00
[52] U.S. Cl. ............................... 296/97 G; 296/97 D; 160/DIG. 3
[58] Field of Search ............... 296/97 R, 97 C, 97 D, 296/97 G, 97 H; 160/DIG. 3

[56] References Cited

U.S. PATENT DOCUMENTS

| | | | |
|---|---|---|---|
| 2,922,676 | 1/1960 | Czajkowski | 296/97 |
| 3,282,623 | 11/1966 | Paro | 296/97 R |
| 4,023,855 | 5/1977 | Janata et al. | 296/97 C |
| 4,043,587 | 8/1977 | Giallovrakis et al. | 296/97 D |

Primary Examiner—Richard A. Bertsch
Attorney, Agent, or Firm—McCormick, Paulding & Huber

[57] ABSTRACT

A universal glare shield for attachment to the windshield of an automobile comprises a flexible panel which has breakaway marginal portions. Additional portions of the panel are adapted to be broken away to form a slot opening through one edge of the panel for receiving a rearview mirror mounting post which projects from the windshield. Suction cups or strips of adhesive secured to the panel facilitate attachment to the windshield surface.

10 Claims, 7 Drawing Figures

GLARE SHIELD

BACKGROUND OF THE INVENTION

This invention relates in general to glare shields and deals more particularly with an improved glare shield for attachment to the inner surface of an automobile windshield. Many automobiles currently manufactured have rearview mirrors which are carried by mounting posts adhered to the inner surfaces of the vehicle windshields and which project therefrom. Such vehicles are generally provided with one or two adjustable sun visors secured at one or both sides of the rearview mirror and which may be adjusted to shield the driver or passenger from the glare of the sun. However, the rearview mirror mounting arrangement is such that there is an exposed area above or below eye level and in the vicinity of the mirror which cannot be covered by either sun visor. As a result of this condition, in the early hours of the morning or in the later afternoon, when the sun is at a low angle, the driver or passenger may be exposed to blinding glare from the sun which can seriously impair visibility. Heretofore, various glare shields have been provided which are suitable for attachment to the inner surface of the windshield, however, such shields are generally not adapted to be positioned in the exposed area of the windshield hereinbefore described, because of interference caused by the mirror mounting arrangement. The present invention is concerned with this problem. More specifically, it is the general aim of this invention to provide an improved universal glare shield for attachment to the windshield of an automobile and which may be readily adapted to fit a wide range of makes and models of automobiles having diverse rearview mirror mounting arrangements.

SUMMARY OF THE INVENTION

In accordance with the present invention an improved glare shield is provided for attachment to an automobile windshield in straddling relation to a mirror support member and which comprises a flexible panel which has a main portion breakaway means for defining a slot of selectable depth opening through one side edge of said panel for straddling the mirror mounting member, and attaching means associated with the main portion for releasably securing the panel to the surface of the automobile windshield.

DETAILED DESCRIPTION OF THE PREFERRED EMBODIMENT

Figure 1:
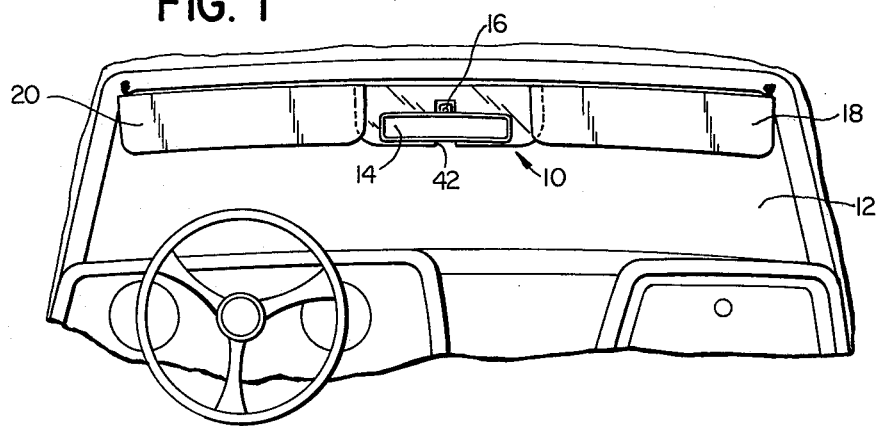
FIG. 1 is a fragmentary view of the windshield area of an automobile as viewed from the interior of the vehicle and shown with a glare shield embodying the present invention mounted thereon.

Turning now to the drawing, and referring first to FIG. 1, a glare shield embodying the present invention, and indicated generally by the reference numeral 10, is shown mounted on the inner surface of an automobile windshield indicated at 12. The automobile has a rearview mirror 14 supported by a mounting post 16 adhered to the inner surface of the windshield 12 and projecting therefrom. Right and lefthand adjustable sun visors, indicated at 18 and 20, are mounted on the vehicle at opposite sides of the mirror 12, substantially as shown. It will be noted that when the visors are adjusted to downwardly turned positions, as shown in FIG. 1, there is a substantial area of the windshield in the vicinity of the mirror 14 and at or above the eye level of the driver and passenger which is exposed and which cannot be covered by either sun visor. The illustrated glare shield 10 is positioned in this area of the windshield and provides substantial coverage for the exposed windshield area between the visors whereby to protect both the driver and the passenger from glare of sun rays entering the windshield in this area.

Figure 5:
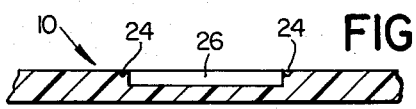
FIG. 5 is a somewhat enlarged sectional view taken along the line 5—5 of FIG. 2.

Considering now the glare shield 10 in further detail and referring more particularly to FIGS. 2-5, the shield generally comprises a flexible panel 22, preferbly made from a suitable plastic material such as vinyl, and may be opaque or translucent. The panel 22 is generally rectangular and rounded at its lower corners. parallel spaced apart lines of weakening 24, 24 are scribed on or molded into the panel near the central portion thereof and extend transversely of the panel 12 from its lower edge toward its upper edge and terminate in spaced relation to the upper edge, substantially as shown. Preferably, the lines of weakening comprise generally V-shaped grooves which open through the front or inner surface of the panel, as best shown in FIG. 5.

Figure 2:
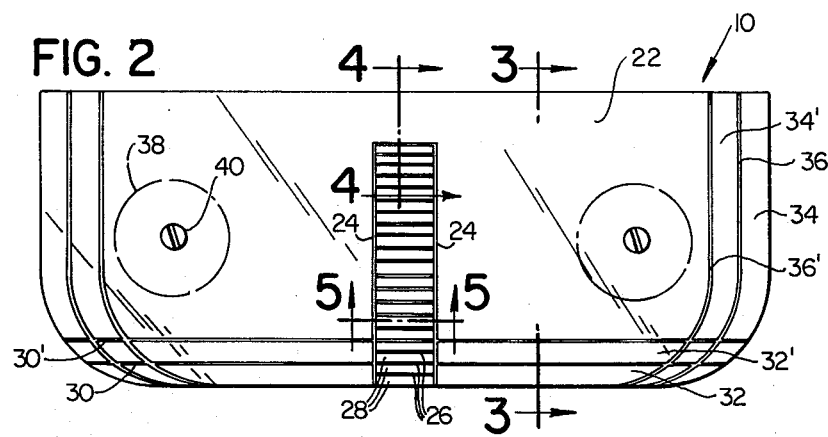
FIG. 2 is a somewhat enlarged front elevational view of the glare shield shown in FIG. 1.
Figure 3:
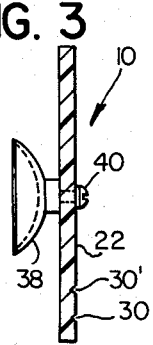
FIG. 3 is a sectional view taken along the line 3—3 of FIG. 2.
Figure 4:
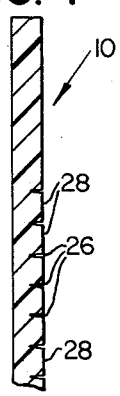
FIG. 4 is a somewhat enlarged sectional view taken along the line 4—4 of FIG. 2.

Additional parallel lines of weakening or grooves 26, 26, scribed on or molded into the panel 22, extend longitudinally thereof between the transverse lines of weakening 24, 24. The lines of weakening 26, 26 are arranged in closely spaced series and cooperate with the lines of weakening 24, 24 to define a series of breakaway portions 28, 28, as shown in FIG. 2. At this point, it should be noted that the grooves 26, 26 are of substantially greater depth than the grooves 24, 24.

At least one line of weakening 30 is formed on the panel and extends longitudinally across the panel to separate a breakaway lower marginal portion 32 from the remaining or main portion of the panel. The line of weakening 30 is aligned with an associated one of the lines of weakening 26. The illustrated embodiment 10 is provided with two such lines of weakening 30, 30' which separate two breakaway marginal portions 32 and 32' from the main portion of the panel 22.

Preferably, and as shown the panel 22 is also provided with one or more breakaway marginal end portions at its opposite ends. The illustrated glare shield 10 includes two such breakaway portions, indicated at 34, 34'. These breakaway end portions are separated from the main portion of the panel by associated lines of weakening 36, 36'. The lines of weakening 30, 30' and 36, 36' are scribed into or molded into the panel and preferably take the form of V-shaped grooves which open through the inner surface of the panel and which are similar to the other lines of weakening previously described.

To facilitate attachment to the windshield, the panel carries two flexible rubber or plastic suction cups 38, 38 which are secured to the main portion of the panel by suitable means such as the fasteners 40, 40.

The breakaway central portions, 28, 28, as defined by the lines of weakening 24, 24 and 26, 26, are adapted to be removed from the panel, as necessary, to form a notch of sufficient depth to provide clearance for the rearview mirror mounting post 16. A typical notch formed by breaking away several portions 28, 28 is indicated at 42 in FIG. 1. In removing the central breakaway portions 28, 28, it is preferable to cut along the lines of weakenings 24, 24 with a knife or shears to the desired depth of the notch to be formed. Thereafter, the central portions to be removed may be readily snapped off along an appropriate one of the lines of weakening 26, 26.

Various marginal portions of the panel may also be broken away along respectively associated lines of weakening 30, 30', and for 36, 36', as required, to reduce the size of the panels to satisfy the requirements of a specific vehicle. The various lines of weakening formed on the panel provide a generally pleasing design in addition to serving the functional purposes hereinbefore described.

Figure 6:
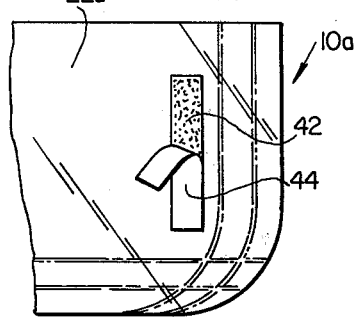
FIG. 6 is a fragmentary rear elevational view of another glare shield embodying the present invention.

Referring now to FIG. 6, another glare shield embodying the invention, and indicated generally at 10a, is shown wherein an alternate form of attachment is provided. The glare shield 10a includes a panel 22a which has patches of adhesive 42 (one shown) attached to its outer surface. Each adhesive strip is associated with the main body of the panel 22a and is permanently adhered thereto. The adhesive patch or strip is covered with a strip of release material 44 which is peeled away to expose the tacky surface of the adhesive when the panel 22a is mounted.

Figure 7:
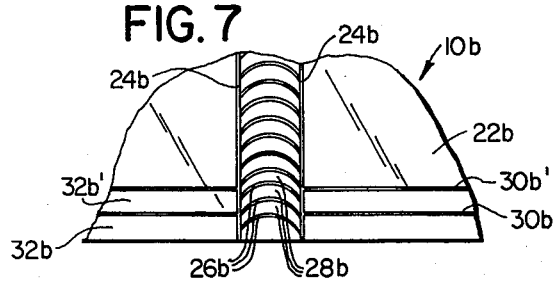
FIG. 7 is a fragmentary front elevational view of still another glare shield embodying the present invention.

In FIG. 7 there is shown still another glare shield embodying the present invention and indicated generally at 10b. Parts of the shield 10b which generally correspond to parts previously described bear the same reference numerals as the previously described parts and a letter b suffix and will not be hereinafter described in detail. The glare shield 10b comprises a panel 22b which has lines of weakening scribed thereon or molded therein to define breakaway portions, substantially as aforedescribed. However, it differs from the shield 10 previously described in that the lines of weakening 26b, which define breakaway portions of a notch, are of arcuate form. This arrangement presents a pleasing appearance and more closely conforms the shape of the notch, formed by breaking away one or more portions 26b, to the general contour of an associated mirror mounting post.

I claim:

1. A glare shield for attachment to an automobile windshield in straddling relation to a mirror support member associated with the windshield, said glare shield comprising an elongated panel, breakaway means for defining a slot of selectable depth opening through one side edge of said panel, said breakaway means including two longitudinally spaced first lines of weakening formed in said panel extending transversely inwardly from a central portion of said one side edge of said panel and terminating in transversely spaced relation to another side edge of said panel opposite said one side edge and transversely spaced second lines of weakening formed in said panel extending between said first lines of weakening and terminating at junctions with said first lines of weakening, said first and second lines of weakening and a portion of said one side edge defining a series of contiguous breakaway portions for selective breakaway removal from said panel to define said slot, and attaching means for releasably securing said panel to a surface of an automobile windshield.

2. A glare shield as set forth in claim 1 wherein said second lines of weakening comprises arcuate lines of weakening.

3. A glare shield as set forth in claim 1 wherein said lines of weakening comprise continuous grooves formed in said panel.

4. A glare shield as set forth in claim 3 wherein some of said grooves are deeper than other of said grooves.

5. A glare shield as set forth in claim 3 wherein the grooves defining said second lines of weakening are substantially deeper than the grooves defining said first lines of weakening.

6. A glare shield as set forth in claim 1 wherein said panel is generally rectangular and made from flexible plastic material.

7. A glare shield as set forth in claim 1 wherein said panel has at least one third line of weakening generally parallel to an associated marginal edge of said panel and separating an associated marginal portion of said panel from the main portion of said panel.

8. A glare shield as set forth in claim 1 wherein said attaching means comprises a suction cup.

9. A glare shield as set forth in claim 1 wherein said attaching means comprises a patch of adhesive adhered to one surface of said panel.

10. A glare shield for attachment to an automobile windshield in straddling relation to a mirror support member associated with the windshield, said glare shield comprising a generally rectangular translucent plastic panel, breakaway means for defining a slot having a selectable depth and opening through one side edge of said panel, said breakaway means including two longitudinally spaced first lines of weakening extending transversely inwardly from a central portion of said one side edge of said panel and terminating in transversely spaced relation to another side edge of said panel opposite said one side edge and transversely spaced second lines of weakening extending between said first lines of weakening and forming junctions therewith, said lines of weakening being defined by continuous grooves extending below the surface of said panel, said first and second lines of weakening and a portion of said one side edge defining a series of contiguous breakaway portions adapted to be selectively broken from said panel to define said slot, a series of third lines of weakening generally parallel to at least one associated marginal edge of said panel and separating associated breakaway marginal portions from the main portion of said panel, and at least one suction cup secured to the main portion of said panel.

* * * * *